Dec. 9, 1930. H. SEBELL 1,784,115
COMBINED AUTOMOBILE COVER AND TENT
Filed May 10, 1929 4 Sheets-Sheet 1

Inventor
Harry Sebell
by Heard Smith & Germaine
Attys

Dec. 9, 1930.  H. SEBELL  1,784,115
COMBINED AUTOMOBILE COVER AND TENT
Filed May 10, 1929    4 Sheets-Sheet 2
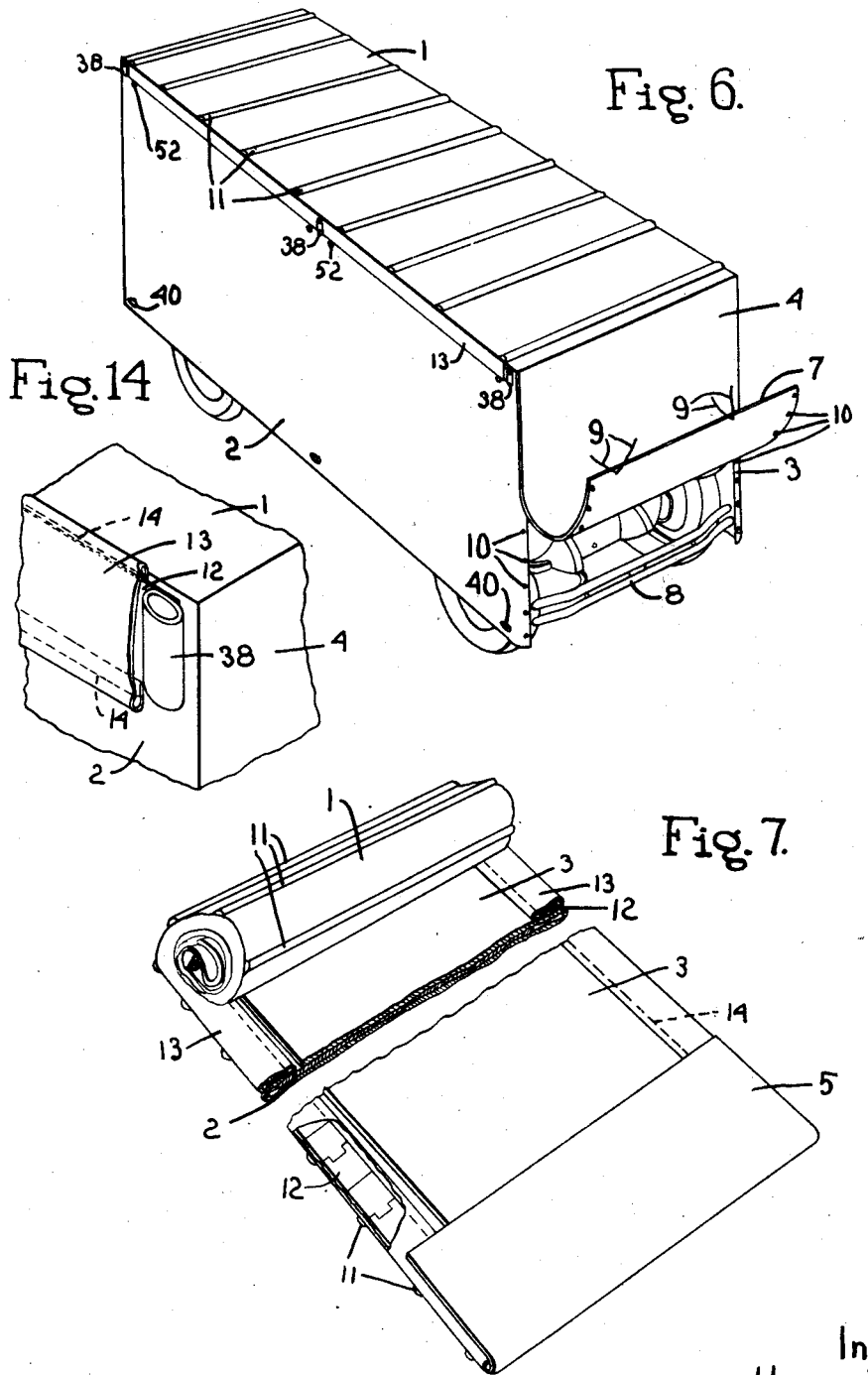
Inventor
Harry Sebell
by Heard Smith & Tennant
Attys.

Dec. 9, 1930.   H. SEBELL   1,784,115
COMBINED AUTOMOBILE COVER AND TENT
Filed May 10, 1929   4 Sheets-Sheet 3
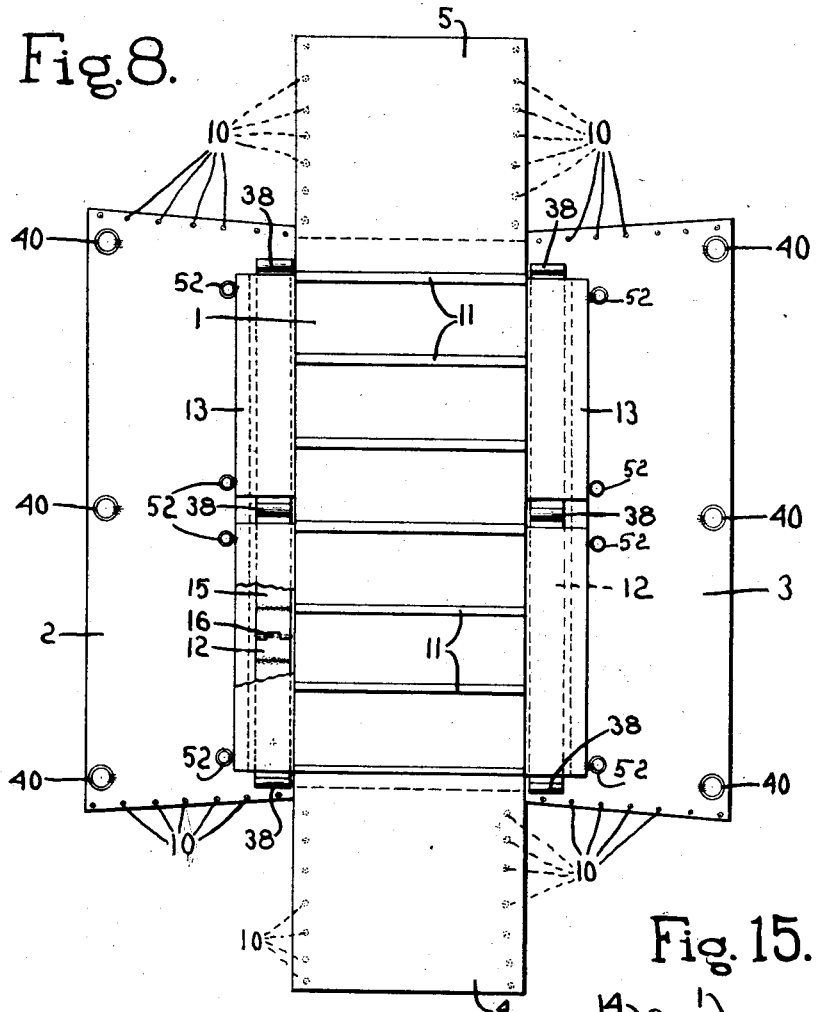
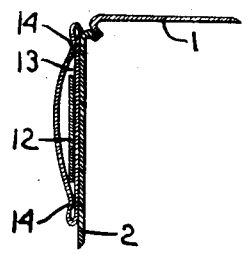
Inventor
Harry Sebell
by Heard Smith & Dennant
Attys.

Dec. 9, 1930.    H. SEBELL    1,784,115
COMBINED AUTOMOBILE COVER AND TENT
Filed May 10, 1929    4 Sheets-Sheet 4

Inventor
Harry Sebell
by Heard Smith & Tennant
Attys

Patented Dec. 9, 1930

1,784,115

UNITED STATES PATENT OFFICE

HARRY SEBELL, OF BOSTON, MASSACHUSETTS

COMBINED AUTOMOBILE COVER AND TENT

Application filed May 10, 1929. Serial No. 361,953.

This invention relates to an automobile cover which is also adaptable for use as a tent. The device is formed with a top or roof section and with side and end sections which depend from the top or roof section when the device is in use. The top or roof section is reinforced or stiffened in such a way that it will retain its flat shape when the device is in use but the reinforcement is of such a character as to permit the top section with the side sections to be readily rolled up into a compact space when it is desired to store the cover.

The invention also comprehends a novel carrier designed to be secured to the rear of an automobile and which not only furnishes a carrier for the cover when it is folded and rolled up but also provides an anchoring member to which the rear end of the cover may be attached. When the device is used as an automobile cover the stiffened or reinforced top thereof is placed on the top of the automobile which is enclosed between the depending sides and ends of the device. The front and rear end flaps or sections are anchored to the car in some suitable way. The lower edge of the front section may be tied to the front bumper and the rear end section may be either tied to the rear bumper or if the carrier is employed it will be tied to the carrier.

When it is desired to use the car the end sections may be disconnected from the side sections and the sides and ends folded over onto the top and then the top may be rolled up to form a roll which can be conveniently carried by the carrier attached to the back of the car.

The device may be disconnected entirely from the car and supported on poles thereby forming a tent.

In order to give an understanding of the invention I have illustrated in the drawings a selected embodiment thereof which will now be described after which the novel features will be pointed out in the appended claims.

Fig. 6 is a perspective view of an automobile with the cover enclosing and protecting the same;

Fig. 7 is a perspective view showing the manner in which the combined cover and tent can be folded up for transportation;

Fig. 8 is a view illustrating the cover spread out with the side and end sections lying in the same plane as the top;

Fig. 9 is an enlarged section on the line 9—9, Fig. 4;

Fig. 14 is a fragmentary perspective view showing one of the pole-receiving sockets;

Fig. 15 is a section similar to Fig. 9 but showing the side sections detachable.

Figure 1:
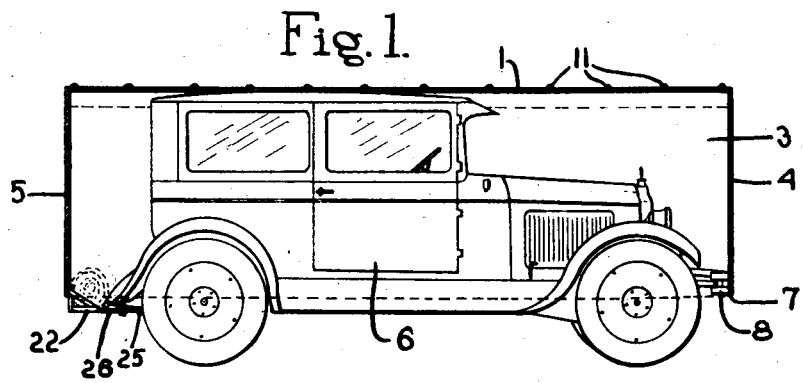
Fig. 1 is a view illustrating my device as employed for covering an automobile, the automobile being shown in side elevation and the cover in section.

My improved cover and tent is formed with a top section 1, with two side sections 2 and 3, with the front section 4 and rear section 5. The device is preferably long enough to enclose an automobile 6 and the device is constructed so that when it is placed over an automobile, as shown in Fig. 1, the top section 1 will be stiff in both a transverse and a longitudinal direction so that it will maintain a flat shape as shown in Fig. 1 even though the ends thereof are not supported.

The side sections 2 and 3 and the end sections 4 and 5 depend from the top 1 and the complete device is of sufficient length to substantially enclose the automobile. The end and side sections may be separably secured together at the corners and each section may be either permanently secured to the top or roof section 1 or may be detachably secured thereto by suitable separable fasteners.

In Fig. 9 I have shown the side sections as being permanently connected to the top 1. In Fig. 15 I have shown the side sections 2 separable from the top 1. In this embodiment the top 1 has a depending skirt portion 68 to which the side sections 2 are detachably secured by means of separable fasteners 69. The upper edge of the side flaps is located inside of the skirt so that there can be no leakage at this point.

When the device is in use covering an automobile the lower edge 7 of the front end section 4 may be secured to the front bumper 8 of the automobile by any suitable means as for instance by tie cords 9, and the lower edge of the rear end section 5 may be secured either directly to the automobile or to any other suitable anchoring fixture.

When the device is in use the vertical edges of the end sections 4 and 5 may be detachably secured to the vertical edges of the side sections by any suitable separable fasteners indicated at 10 in Fig. 8.

Fig. 8 shows the complete device with the side and end flaps spread out.

The top 1 is shown as reinforced transversely by suitable reinforcing members 11 in the nature of bars of wood or any other suitable material which extend across the top from one side to the other and are secured thereto. These hold the top flat in a transverse direction.

Means are provided whereby the top will also be held from buckling or will be held rigid in a longitudinal direction when the device is in use while at the same time permitting the cover to be folded or rolled up when it is to be stored. One way of accomplishing this is by means of the reinforcing members shown in Figs. 4, 5, 7, 8 and 9. In the construction shown in these figures the device is provided at each side of the top with an articulated reinforcing member 12 which is shown as located in a pocket 13 extending longitudinally of the device adjacent the top and at the upper edge of the side flap. This pocket can conveniently be made of a strip of fabric folded to provide the pocket shape and then sewed to the upper edge of the side 2 or 3 as indicated at 14. Each articulated reinforcing member 12 comprises a plurality of sections 15 which are hinged together as shown at 16.

Since these reinforcing members are attached to the upper edges of the side members 2 and 3 it will be understood that when the device is in use as shown in Fig. 6 with the side members depending said reinforcing members 12 will extend along the upper edge of the side members 2 and 3 adjacent the side edges of the top section 1 as shown in Fig. 6. When in this position each member will be stiff in a vertical direction although it is flexible in a transverse direction. The stiffening bars 11, however, hold the top stiff in a transverse direction and the articulated reinforcing members 12 hold the top stiff in a longitudinal direction so when the device is in use the top will be stiffened both transversely and horizontally and will retain a flat shape shown in Fig. 1.

When the device is to be rolled up for storage the side flaps 2 and 3 may be either folded over onto the top 1, which would be done if the side flaps were permanently secured to the top, or if they are detachably connected to the top section they may be detached therefrom and then laid on the top section. The partially folded device may then be rolled up from one edge, this operation being permitted because of the position of the articulated reinforcing members 12.

This operation of folding and rolling up the cover may be accomplished either by first removing the cover from the automobile and spreading it out on the ground as shown in Fig. 8 and then folding the side flaps 2 and 3, or it may be done while the cover is still on the automobile by simply folding the side flaps over on top of the roof section and then rolling up the device from the front end.

Figure 10:
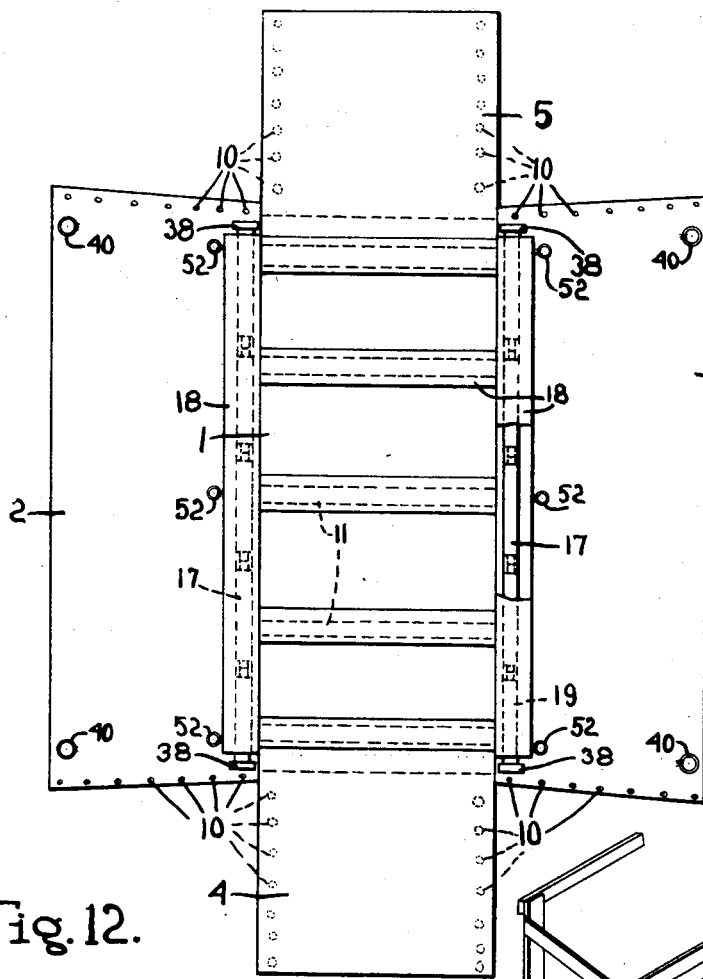
Fig. 10 is a view similar to Fig. 8 showing a different embodiment of the invention.
Figure 11:
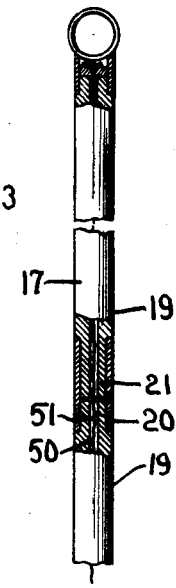
Fig. 11 is a fragmentary sectional view of the reinforcing or stiffening member shown in Fig. 10.

In lieu of the articulated reinforcing members 12 I may employ sectional reinforcing members such as shown in Figs. 10 and 11. These reinforcing members are in the nature of sectional rods 17 which are located in pockets 18 formed on the sides 2 and 3 respectively. The rods 17 are composed of separable sections 19 which can be secured together end to end. The object in making the rods sectional is to enable them to be more easily stored.

As shown in Fig. 11 one rod section, the lower rod section in Fig. 11, has rigid therewith a ferrule 20 into which the reduced end 21 of the next rod section can be inserted. When the rod sections are in place both the sides 2 and 3 will be stiffened or reinforced longitudinally so that when the device is used to enclose an automobile with the top section 1 resting on the automobile top such top section will be prevented from buckling in a direction from front to rear. With this construction whenever it is desired to fold up the device the sectional rods may be removed from the pockets 18 which are open at the ends for that purpose, and then the side flaps 2 and 3 folded over onto the top as above described after which the partially folded device may be rolled up as will be readily understood.

The rods 17 are preferably made with sections of a length about equal to the width of the top section 1 so that these rod sections can be readily placed in the roll as the partially folded device is rolled up.

In order to facilitate the removal of the rods 17 from the pockets 18 I have provided the rod sections with a central opening 50 through which a string 51 extends. At one end the string is secured to one end section, the other end of the string being free at the opposite end of the rod. When the rods are to be removed from the pockets 18 a pulling strain will be applied to the free end of the string with the result that all the sections of the rod will be pulled through the pocket.

Figures 2, 3:
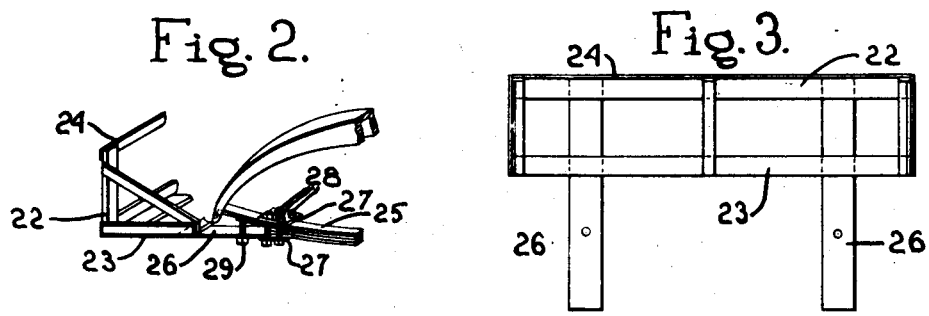
Fig. 2 is a detail view illustrating the manner of securing the carrier to the automobile.
Fig. 3 is a top plan view of the carrier.
Figure 4:
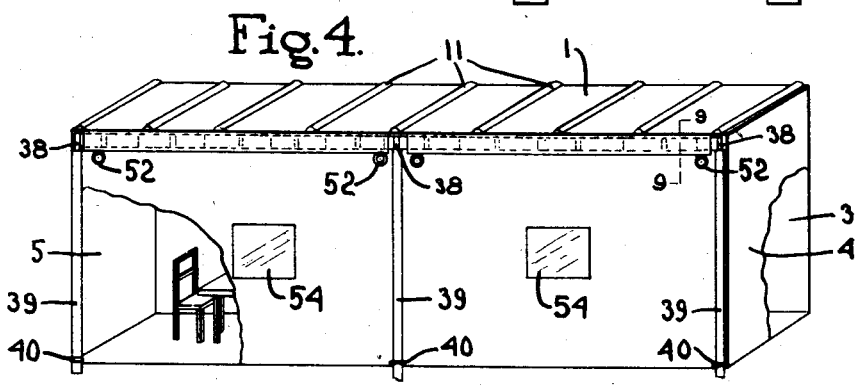
Fig. 4 is a perspective view illustrating the device when used as a tent.
Figure 5:
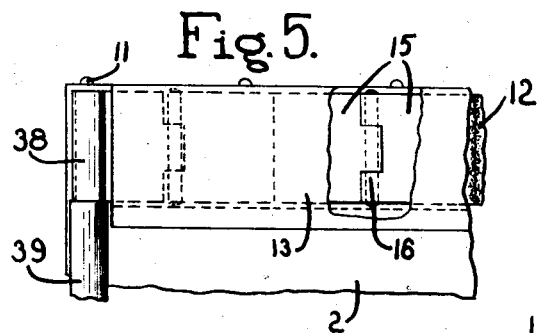
Fig. 5 is a fragmentary view with a part broken out showing one form of reinforcing or stiffening member.

My invention also comprehends a suitable carrier adapted to be attached to the automobile and designed to support the rolled up cover. One form of carrier is shown in Figs. 2 and 3. This comprises a rack 22 comprising a bottom portion 23 and a back portion 24. The rack shown in Figs. 2 and 3 is adapted to be attached to the rear end of the rear springs 25 of the automobile and for this purpose said rack is provided with the two supporting arms 26 that extend under the rear ends of the springs 25 and are secured thereto by a clamping member comprising clamping plates 27 adapted to rest on the under side of the arm 26 and the top of the spring 25 and clamping bolts 28 connecting said plates.

Each arm 26 is provided with an adjusting screw 29 which is adapted to engage the spring in the rear of the clamps, the purpose of this adjusting screw being to provide means whereby the arms 26 may be adjusted into a substantially horizontal position. This adjusting screw is screw threaded through the arms 26 and bears against the spring and by adjusting these screws the horizontal position of the arms 26 may be varied somewhat. A rack thus constructed can be easily attached to the springs of an automobile and if desired may permanently remain so attached while the automobile is in use.

Said rack 22 is intended to be large enough to receive the cover when the latter is rolled up in a bundle as above described and as indicated by dotted lines in Fig. 1. This makes it possible for the owner of the automobile to carry his garage right along with him and whenever it is time to put the car up for the night it is only necessary to unroll the cover and spread it over the automobile and then fasten the front end section 4 to the front bumper, and the rear end section 5 to the rack 22.

Figure 12:
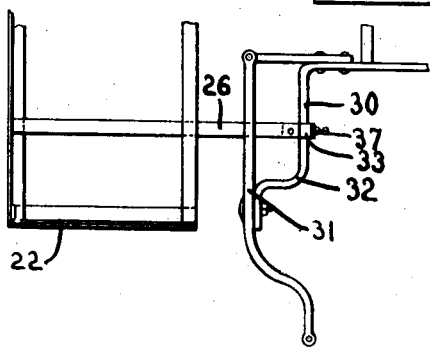
Figs. 12 and 13 are detail views showing another way of securing the carrier to an automobile.
Figure 13:
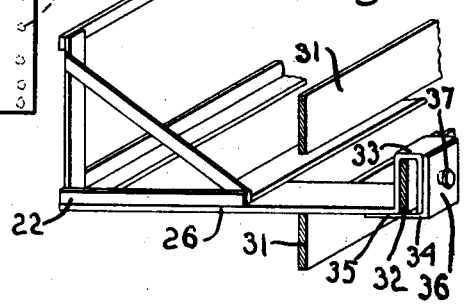

Instead of fastening the rack 22 to the rear springs 25 as shown in Fig. 2 it is possible to secure this to the rear bumper as shown in Figs. 12 and 13. These figures show the style of bumper which comprises the two bumper elements one situated on each side of the spare tire and directly in back of the rear fender. These bumper elements are indicated generally at 30 and each comprises two rear bars 31 which are spaced from each other and a brace bar 32 which is situated in a horizontal plane between the bars 31.

In order to attach the carrier 22 to a bumper as above described I propose to make the arms 26 of the carrier with the inverted U-shaped portion 33 which hooks over the brace bar 32 and I propose to employ an L-shaped clamping member 34 having one arm 35 secured to the carrier arm 26 and another arm 36 overlying one side of the U-shaped portion 33. 37 indicates a clamping bolt which is screw threaded through the arm 36 and the side of the U-shaped member 33 in contact therewith and which clamps against the brace bar 32. The arms 36 of the carrier may rest on the lower bumper arm 31 if desired and by being clamped to the brace bar 32 the carrier will be rigidly retained in position.

The cover above described not only can be used as a cover for automobiles but may be used for a tent. For this purpose said cover is provided with sockets 38 at each corner adapted to receive the upper end of a tent pole 39 and if desired additional sockets may be used intermediate of the cover. The side flaps 2 and 3 are also provided with rings 40 through which the poles may be inserted. These poles may be set into the ground and they will support the tent in upright position, the rings 40 serving to hold the side flaps in place. It will be understood, of course, that it will be preferable to anchor the tent securely by means of guy ropes which may be tied to grommets 52 with which the side flaps 2 and 3 of the device are provided. I may also provide said side flaps with windows 54 which are closed with isinglass or some other flexible transparent material so that persons within the tent or cover may see it.

When the device is used as a tent the transverse reinforcing members 11 and the longitudinal reinforcing members 12 or 17 will hold the top of the tent flap like the roof of a room so that the interior of the tent presents a flat ceiling. This makes all parts of the tent equally available for use.

While I have illustrated herein a selected embodiment of my invention I do not wish to be limited to the constructional features shown.

I claim:

1. A combined automobile cover and tent comprising a top section which is non-foldable longitudinally, side sections secured to the top section and adapted to depend therefrom, and means associated with the side sections adjacent the line of attachment thereof to the top section to retain the top section rigid in a longitudinal direction.

2. A combined automobile cover and tent comprising a top section rectangular in shape and reinforced transversely, side sections and end sections secured to the sides and ends of the top section and adapted to depend therefrom, and means associated with each side section adjacent the top thereof to hold the side section rigid in the direction of its length.

3. A combined automobile cover and tent comprising a top section which is reinforced transversely, side and end sections secured to the edges of the top section and depending therefrom, means associated with each side section adjacent its top edge to prevent the top from buckling in a longitudinal direction, and pole-receiving sockets adjacent the side edges of the top for the reception of supporting poles.

4. A combined automobile cover and tent comprising a top section rectangular in cross section, side and end sections secured to the edges of the top section and depending therefrom, each side section having a pocket at its upper edge adjacent the top section and a reinforcing member in each pocket, said reinforcing members holding the top from buckling in the direction of its length.

5. A combined cover for an automobile and tent comprising a top section rectangular in shape, side sections secured to the opposite side edges of the top section and adapted to be folded onto the top section, end sections secured to the end edges of the top section and also adapted to be folded thereonto, said top section adapted to rest on the top of the automobile when the device is in use with the side and end sections depending therefrom, and means to stiffen the top section in the direction of its length and to maintain it in a flat condition.

6. A combined cover for an automobile and tent comprising a top section rectangular in shape, side sections secured to the opposite side edges of the top section and adapted to be folded onto the top section, end sections secured to the end edges of the top section and also adapted to be folded thereonto, said top section adapted to rest on the top of the automobile when the device is in use with the side and end sections depending therefrom, each side section having a pocket extending longitudinally thereof adjacent its upper edge, and a stiffening member in each pocket adapted to hold the top from buckling in the direction of its length.

7. A combined automobile cover and tent comprising a top section which is non-foldable longitudinally, side sections secured to the edges of the top section and adapted to either depend therefrom or be folded over onto the top section, and means associated with the side sections to retain the top section rigid in a longitudinal direction when the side sections are depending from the top section but being non-operative for this purpose when the side sections are folded onto the top section.

8. A combined automobile cover and tent comprising a top section which is non-foldable longitudinally but foldable transversely, side sections secured to the top section and adapted either to depend therefrom or to be folded over thereonto, a reinforcing member secured to each side section adjacent to the edge thereof which is attached to the top section, each reinforcing member being rigid in a line parallel to its side section but being flexible in a direction perpendicular to said side section, whereby when the side sections are depending from the top section the top is made rigid in the direction of its length but when the side sections are folded onto the top section the folded sections may be rolled up.

9. A combined automobile cover and tent comprising a top section which is non-foldable longitudinally, side sections secured to the top section along the sides thereof and adapted to occupy operative positions at substantially right angles to the top section or positions in planes substantially parallel to the top section, and a reinforcing member associated with each side section adjacent the line of attachment thereof to the top section, each reinforcing member being rigid in a direction parallel to the plane of the corresponding side section but being flexible in a direction at right angles thereto.

In testimony whereof, I have signed my name to this specification.

HARRY SEBELL.